UNITED STATES PATENT OFFICE.

HERRMAN BARLET, OF NÜREMBERG, BAVARIA, GERMANY.

PASTE FOR CLEANING METALS.

SPECIFICATION forming part of Letters Patent No. 293,998, dated February 26, 1884.

Application filed August 31, 1883. (No specimens.)

*To all whom it may concern:*

Be it known that I, HERRMAN BARLET, a citizen of the German Empire, residing at Nüremberg, in the Kingdom of Bavaria, have invented certain new and useful Improvements in Paste for Cleaning Metals; and I do hereby declare the following to be a full, clear, and exact description of the invention, such as will enable others skilled in the art to which it appertains to make and use the same.

The following substances and, respectively, quantities are necessary to make about one-half kilo. of paste. Two hundred grams of stearine are dissolved by a gentle heat in an iron vessel. When dissolved, two hundred grams oil of stearine are added, but gradually, to prevent stiffening. The two substances are well mixed, and under continual stirring one hundred and twenty grams trip (brown red) are admixed. The mixture thus obtained is passed through a mill or other utensil for trituration, by which proceeding it is still more intimately mixed. This process must be performed in quick tempo, so that the paste cannot become hard. From the mill the mixture runs in a semi-liquid state into a warmed vessel standing before it, in which it is continually stirred, while about forty drops of nitrobenzoyle are added. The paste is now more liquid, and is poured into the tin boxes in which it is to be sent away and sold. These boxes, however, must stand open for at least twelve hours, else an exudation takes place which would render the paste spotty.

I claim—

A paste for cleaning metals, obtained by mixing stearine, oil of stearine, trip, and nitrobenzoyle, according to the process described above.

In testimony whereof I have affixed my signature in presence of two witnesses.

HERRMAN BARLET.

Witnesses:
 JOH. ANDR. BESOLD,
 ALF. MUSSINAN.